Patented Nov. 4, 1924.

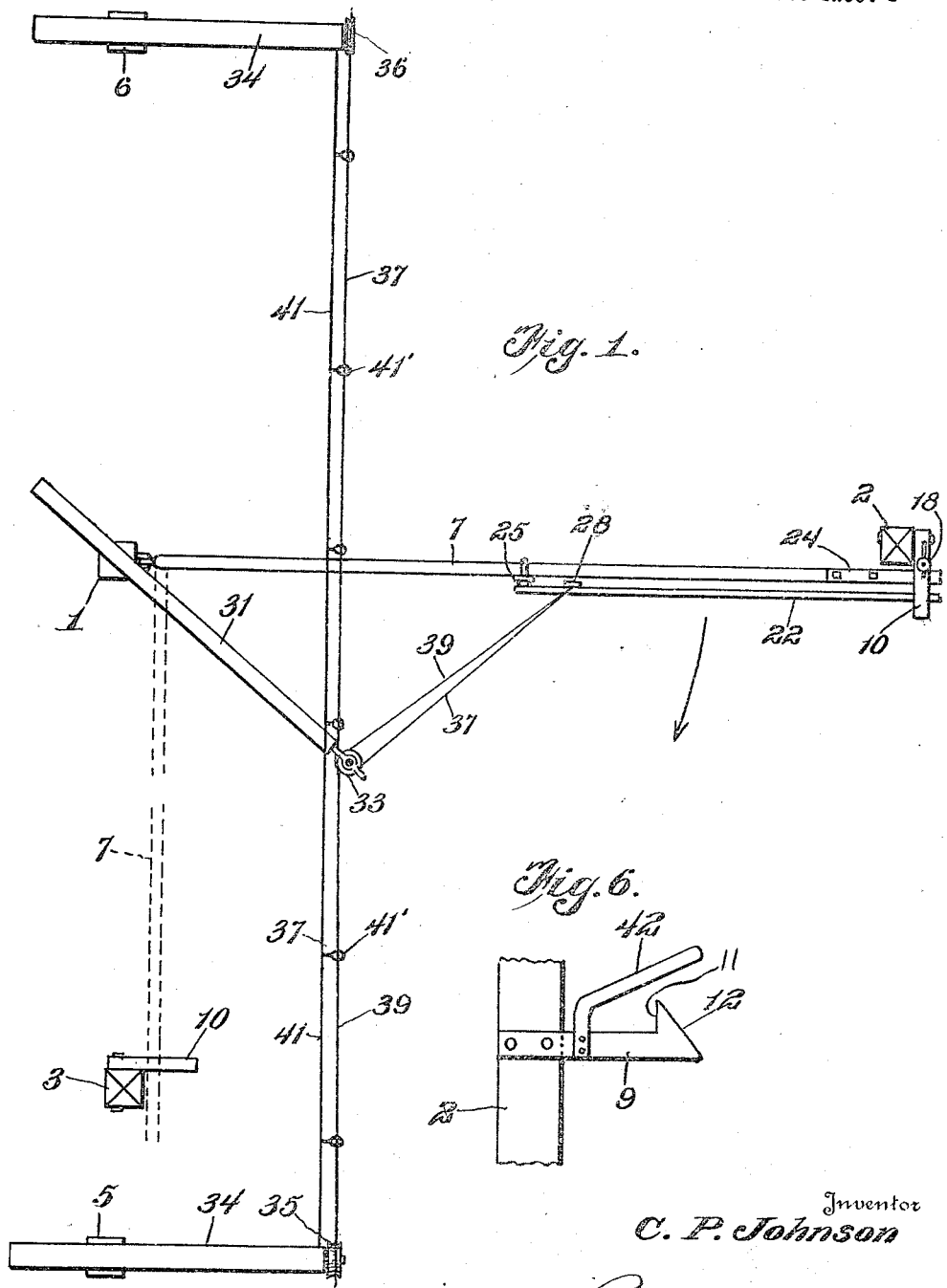

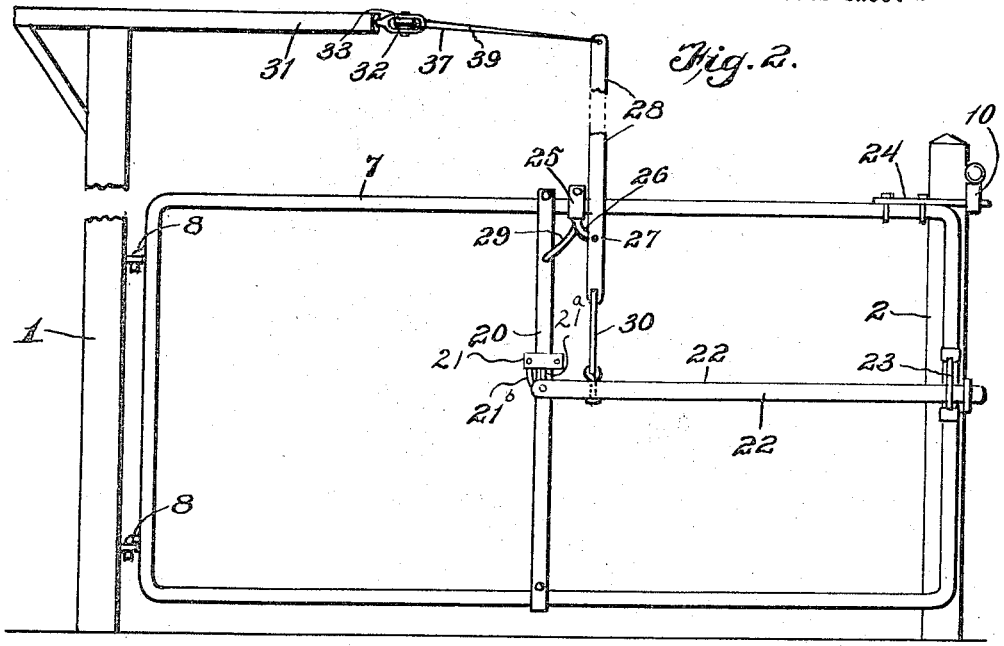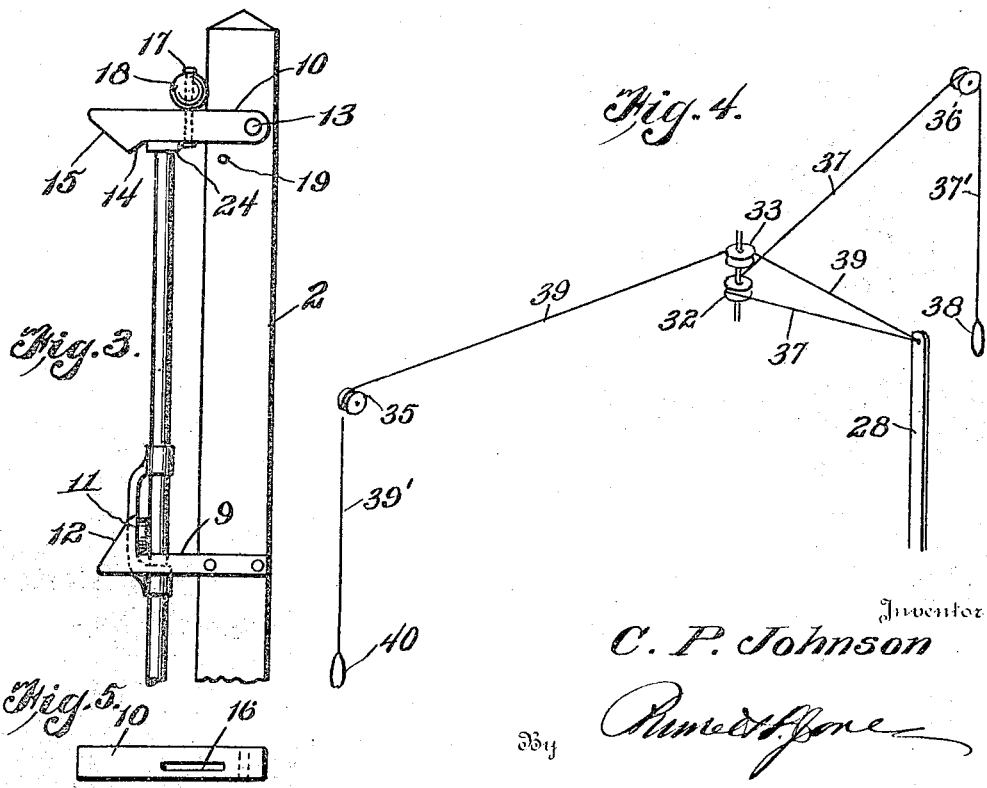

1,514,087

UNITED STATES PATENT OFFICE.

CHARLES P. JOHNSON, OF LEBANON, TENNESSEE.

GATE OPENING, CLOSING, AND LATCHING MECHANISM.

Application filed January 4, 1923. Serial No. 610,662.

*To all whom it may concern:*

Be it known that I, CHARLES P. JOHNSON, a citizen of the United States, residing at Lebanon, in the county of Wilson and State of Tennessee, have invented new and useful Improvements in Gate Opening, Closing, and Latching Mechanisms, of which the following is a specification.

This invention relates to gate opening, closing and latching mechanism, and the object of the invention is to provide simple, reliable and efficient means for opening or closing a swinging gate from either side thereof, and for latching the gate in open or closed positions.

Another object of the invention is to provide a gate which may be mounted to swing within an arc of 90° only and yet be opened or closed by controlling devices arranged at any predetermined distance beyond either side of the gateway.

With these and other objects in view, the invention consists of the features of construction, combination and arrangement of parts, hereinafter fully described and claimed, reference being had to the accompanying drawings, in which:—

Figure 1 is a top plan view of the gate and its controlling mechanism, showing the gate arranged and latched in closed position.

Figure 2 is a view in elevation looking toward the inner side of the gate.

Figure 3 is an end elevation looking toward the swinging end of the gate and one of the keeper posts.

Figure 4 is a perspective view showing the arrangement of the operating ropes or cables.

Figure 5 is a top plan view of one of the latches.

Figure 6 is a view of a modified form of latch dog.

Referring now more particularly to the drawings, 1 designates a hinging post arranged at one side of the gate-way, 2 a main latch post arranged at the opposite side of the gateway, 3 an auxiliary latch post located in alinement with post 1 against which the gate abuts when in open position, and 5 and 6 are supporting posts arranged in alinement with and beyond opposite sides of the post 1.

The gate 7 may be of any approved form and construction and is hinged at one end, as at 8, to the post 1 to swing at its free end between the posts 2 and 3, against which posts 2 and 3 the free end of the gate bears when the gate is in closed and open positions, respectively. On each post 2 and 3 are lower and upper latch dogs 9 and 10, respectively. The dog 9 is fixed to the post and provided with an upstanding locking lip 11 and a beveled guide face 12 leading thereto. The dog 10 is pivoted at one end to the post, as at 13, and is provided with a downwardly projecting beveled latch lip 14 and a beveled guide surface 15 leading thereto. The body of dog 10 is slotted, as at 16, to receive a stem 17 carrying a suitable weight 18, operating to oppose a determined resistance to the upward movement of dog 10 and to hold it, when engaged with the gate, in positive latching position. A stop pin 19 is provided on the post, to limit the downward movement of dog 10 when freed from engagement with the gate. Stem 15 has a limited degree of adjustment in slot 16 to regulate the action of the weight 18 in an obvious manner.

Provided upon the gate 7, about midway of the length thereof, is an upright 20. On said upright 20 is a bracket cuff or sleeve 21 having an arm 21ª to which is pivoted the inner end of a vertically movable latch bar 22. Another arm 21ᵇ extends from said cuff 21 and engages the upright 20, whereby said cuff is properly braced. As shown, the latch bar 22 slides in a guide 23 at the free end of the gate and projects beyond such end of the gate for engagement and cooperation with the fixed latch dog 9. When the gate is swung to closed position the free end of bar 22 is adapted to engage and slide up the inclined surface 12 and drop into engagement with the latch lip 11 and rest upon the body of dog 9, whereby said latch bar is disposed in locking engagement with said dog. At the upper portion of the free end of the gate is provided a fixed latch bar 24 for engagement and cooperation with the pivoted latch dog 10. When the gate is swung to closed position this bar engages the guide surface 15 and lifts the latch dog 10 against the resistance of the weight 18, the bar 24 thence swinging behind the latch lip 14 and being engaged by the lower surface of the body of dog 10. When the gate swings open the latch bar 24 engages and rides over the beveled lip 14, thus raising the dog 10 out of the path of movement of said bar 24. The dog 10 is thus moved upwardly and downwardly by the bar 24 as the gate swings into and out of closed position, while the latch bar 22 is raised and lowered positively in the opening and closing movements of the gate for cooperation with the fixed latch dog 9.

Mounted on the upper rail of the gate frame is a bracket cuff or sleeve 25 having an arm 26 extending therefrom, to which is intermediately pivoted, as at 27, a latch and engaging actuating lever 28. Another arm 29 extends from bracket 25 and is connected with the upright 20, whereby said bracket is properly braced. The lower end of lever 28 is coupled by a link or other similar connection 30 to the inner end of the movable latch bar 22, the construction being such that when the lower arm of lever 28 swings upwardly and forwardly latch bar 22 will be raised, while when the lower arm of lever 28 swings downwardly and rearwardly the latch bar 22 will be lowered, whereby said latch bar is adjusted for releasing and engaging actions, as will be readily understood.

Mechanism is provided for cooperation with the lever 28 to actuate said lever for latch operating actions, and also for utilizing said lever as an element for imparting opening or closing swinging movements to the gate 7. Secured to the hinging post 1 is a horizontal bar 31 projecting inwardly therefrom to a suitable degree at an angle of from 45° to 55° between the posts 2 and 3 in the arc of swinging movement of the gate 7. At its free end this bar 31 carries a double pulley having the pair of superposed grooved pulley members 32 and 33, and extending inwardly from the posts 5 and 6 are arms 34 carrying grooved pulleys 35 and 36, respectively. A rope or cable 37 is fastened at one end to the upper arm of lever 28, thence extends around one side of the pulley member 32 and toward the arm 34 of post 6, thence around the pulley 36 on said arm, the opposite end of said cable 37 thence depending from said pulley 36 to form an operating end 37′ provided with a suitable handle 38. Another rope or cable 39 is attached at one end to the upper arm of lever 28 and passes around one side of pulley 33, thence in the direction toward the arm 34 of post 5, and has its opposite end terminating in an operating end portion 39′ provided with a suitable handle 40. As shown, a bracing rod or wire 41 may connect and reinforce posts 5 and 6 and bar 31, and this rod or wire 41 carries rings or eyes 41′ through which the ropes or cables 37 and 39 extend and by which they are guided. These operating end portions 37′ and 39′ of the respective cables 37 and 39 are arranged suitable distances beyond the gateway so as to be accessible to a pedestrian or the driver of a vehicle and to be interchangeably used for actuating the cables to swing the gate open and thereafter swing it closed. Assuming that a person desiring to open the gate operates it from the side in the direction in which the gate opens, this person may by grasping the handle 40 and pulling down the operating end of cable 39 draw upon said cable to cause its opposite end to exert a pull upon the lever 28. This pull upon the lever 28 exerts a double effect. In the first part of movement of lever 28 latch bar 22 is raised clear of latch lip 11 of dog 9 on post 2, and the remainder of movement of lever 28 is exerted to swing the gate open until it abuts against post 3 and its latch members 22 and 24 engage the latch members 9 and 10 on said post 3, thus locking the gate in open position. This action is obtained by reason of the fact that, as the portion of cable 37 attached to lever 28 is arranged at an angle to the gate, in its gateway closing position, a pull upon the gate in its direction of opening movement will be instituted. In this operation, but a short, sharp downward pull on handle 40 is necessary to swing lever 28 with sufficient power to unlock the gate and to give it an initial starting opening swing, the remainder of travel of the gate to open position being effected by the momentum thus established. When the person passes through the gateway and desires to close the gate, this is accomplished by drawing down upon handle 38 of the operating end of cable 37, as a result of which action lever 28 will be operated to unlatch the gate from post 3 and to swing it to closed position against post 2, in which operation it is automatically latched to post 2 to again lock the gate in gateway closing position. Similarly a person approaching the gate from the side on which post 6 is located may, by pulling down on handle 38 of the operating end of cable 37, swing the gate open to open position, and latch it in such position, and thereafter may, by pulling down upon handle 40 of the operating end of cable 39, unlatch the gate from post 3 and swing it back to closed position and in latched engagement with post 2. From this it will be understood that the operating ends of the cables 37 and 39 through the described connection of the cables with the lever 28, may be interchangeably employed for opening or closing the gate from either side, in which operations the gate is automatically latched and unlatched, and, in the case of these operations being performed by a rider or driver, they may be carried out without the necessity of the rider or driver leaving his seat. It will be understood, of course, that when the gate 7 swings from open position, in which the lever actuating ends of cables 37 and 39 lie at an angle to the gate on one side of the line of bar 31, said actuating ends of the cables move around the pulley members 32 and 33 as the gate swings to a similar angle to the open gate between the post 3 and bar 31, whereby such lever actuating ends of the cables are disposed in the proper angular relationship of the gate to exert the necessary pull thereon, in each of said operations, for opening and closing actions.

As shown in Figure 6, I may provide each latch dog 9 with a striker guard 42, against which the free end of latch bar 22 may strike, to positively guide said latch lever in its locking and unlocking movements. This striker guard preferably extends outwardly to a point in perpendicular alinement with the extreme outer edge of the body of dog 9 at a reverse angle coinciding with the angle of surface 12. This ensures the certain engagement of the free end of latch bar 22 with the guard, in the event that the bar 22 is at its highest point in guide 23, and the certain driving and guiding of the free end of latch bar 22 down against shoulder 11, to positively lock the gate when closing, as well as the guidance of said free end of latch bar 22 outwardly in proper elevation between parts 11 and 42 in a gate unlocking and opening movement.

Having thus fully described my invention, I claim:

1. In a device of the class described, a latch post, fixed and movable dogs arranged in spaced relation upon said post, a gate, a fixed and a movable latch member carried by said gate and adapted respectively to engage with said movable and fixed dogs of the latch post, and means associated with the gate for moving said movable latch member to releasing position.

2. In a device of the class described, a post, a movable latch dog on said post, a fixed latch dog on said post spaced from the said movable dog, a gate, a latch bar pivoted on said gate and adapted to engage with the said fixed latch dog, a fixed latch member on said gate to engage with the movable dog on said post, a bevel surface on said movable dog to permit of the same disengaging from said fixed latch when the latter is moved in releasing direction, a lever pivoted on said gate, and a connection between said lever and said movable latch.

In testimony whereof I affix my signature.

CHARLES P. JOHNSON.